United States Patent
Tucker et al.

(10) Patent No.: US 11,616,417 B2
(45) Date of Patent: Mar. 28, 2023

(54) OUTER ROTOR MOTOR WITH INTEGRATED BRAKE

(71) Applicant: Nidec Motor Corporation, St. Louis, MO (US)

(72) Inventors: John M. Tucker, St. Louis, MO (US); Jeffrey M. Hutsler, Troy, MO (US); Robert Teal Back, Hazelwood, MO (US)

(73) Assignee: Nidec Motor Corporation, St. Louis, MO (US)

( * ) Notice: Subject to any disclaimer, the term of this patent is extended or adjusted under 35 U.S.C. 154(b) by 347 days.

(21) Appl. No.: 16/847,333

(22) Filed: Apr. 13, 2020

(65) Prior Publication Data
US 2021/0320561 A1    Oct. 14, 2021

(51) Int. Cl.
| | |
|---|---|
| H02K 7/10 | (2006.01) |
| H02K 7/102 | (2006.01) |
| H02K 1/2786 | (2022.01) |
| H02K 21/22 | (2006.01) |
| H02K 11/22 | (2016.01) |
| H02K 11/25 | (2016.01) |
| H02K 11/215 | (2016.01) |

(52) U.S. Cl.
CPC .......... *H02K 7/102* (2013.01); *H02K 1/2786* (2013.01); *H02K 11/215* (2016.01); *H02K 11/22* (2016.01); *H02K 11/25* (2016.01); *H02K 21/22* (2013.01)

(58) Field of Classification Search
CPC .... H02K 1/2786; H02K 11/21; H02K 11/215; H02K 11/22; H02K 11/25; H02K 21/22; H02K 5/10; H02K 7/102; H02K 7/1025
See application file for complete search history.

(56) References Cited

U.S. PATENT DOCUMENTS

| | | | | |
|---|---|---|---|---|
| 6,380,648 | B1* | 4/2002 | Hsu | H02K 11/33 310/67 A |
| 6,998,757 | B2* | 2/2006 | Seguchi | H02K 21/16 310/68 B |
| 2003/0001442 | A1* | 1/2003 | Hsu | H02K 29/08 310/68 B |
| 2010/0270093 | A1* | 10/2010 | Sagara | H02K 7/102 310/43 |
| 2016/0372989 | A1* | 12/2016 | Bourgoine | H02K 7/06 |

FOREIGN PATENT DOCUMENTS

| | | | | |
|---|---|---|---|---|
| CN | 113659788 A | * | 11/2021 | |
| DE | 102018215787 A1 | * | 3/2020 | H02K 11/33 |
| WO | WO-2011159773 A1 | * | 12/2011 | A61G 5/04 |

* cited by examiner

*Primary Examiner* — Naishadh N Desai
(74) *Attorney, Agent, or Firm* — Hovey Williams LLP

(57) ABSTRACT

An electric motor assembly includes an outer rotor motor, a sensor, and a brake assembly. The outer rotor motor includes a stator and a rotor. The rotor at least partly circumscribes the stator and is rotatable relative to the stator about an axis. The rotor includes a rotor core extending radially outwardly to present axially opposite first and second sides, and a plurality of magnets supported relative to the rotor core. The sensor is operable to sense a condition associated with the electric motor assembly. The brake assembly is operably coupled to the rotor core to selectively reduce the rotational speed of the rotor. The brake assembly is positioned at least partly axially outward from the first side of the rotor core, and the sensor is positioned at least partly axially outward from the second side of the rotor core.

15 Claims, 9 Drawing Sheets

OUTER ROTOR MOTOR WITH INTEGRATED BRAKE

BACKGROUND

1. Field

The present invention relates generally to an electric motor assembly having an electric motor and an integrated brake. Embodiments of the present invention concern an electric motor assembly with an outer rotor motor, an integrated brake, and a sensor, wherein the risk of sensor contamination or interference that might be caused by the brake is reduced.

2. Discussion of Prior Art

It is known for an outer rotor motor to be provided with an integrated brake and an encoder for servo motor applications. In conventional servo motors, an outer rotor motor has a front-located rotor plate and an integrated brake mounted on the back of the motor. The servo motor also generally has a shaft encoder mounted directly on the back of the brake to sense rotation of the rotor shaft.

This conventional servo configuration can be problematic for a number of reasons. In general, the relative positioning of the brake and the encoder may negatively impact performance of prior art servos. For instance, brakes are known to cause electromagnetic interference with magnetic encoders. For servos with a magnetic encoder or an optical encoder, brakes also produce debris (such as brake dust) that interferes with encoder operation. The conventional servo motors also can include undue mechanical limitations on load carrying capability because rotor shafts generally may have restrictions on the size of the shaft diameter. Yet further, the prior art servos have an undesirable form factor because conventional brake and sensor arrangements result in the motor having an excessive axial length.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide an outer rotor motor assembly that does not suffer from the problems and limitations of the prior art devices, including those set forth above.

One aspect of the present invention concerns an electric motor assembly that broadly includes an outer rotor motor, a sensor, and a brake assembly. The outer rotor motor includes a stator and a rotor. The rotor at least partly circumscribes the stator and is rotatable relative to the stator about an axis. The rotor includes a rotor core extending radially outwardly to present axially opposite first and second sides, and a plurality of magnets supported relative to the rotor core. The sensor is operable to sense a condition associated with the electric motor assembly. The brake assembly is operably coupled to the rotor core to selectively reduce the rotational speed of the rotor. The brake assembly is positioned at least partly axially outward from the first side of the rotor core, and the sensor is positioned at least partly axially outward from the second side of the rotor core.

Another aspect of the present invention concerns an electric motor assembly that broadly includes an outer rotor motor, a sensor, and a brake assembly. The outer rotor motor includes a stator and a rotor at least partly circumscribing the stator. The rotor is rotatable relative to the stator about an axis and includes a rotor core. The outer rotor motor defines axially opposite motor ends spaced from one another along the axis. The sensor is operable to sense a condition associated with the electric motor assembly. The brake assembly is operably coupled to the rotor core to selectively reduce the rotational speed of the rotor. The brake assembly is positioned in a first axial direction at least partly outside one of the motor ends, and the sensor is spaced from the one motor end in an opposite second axial direction.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
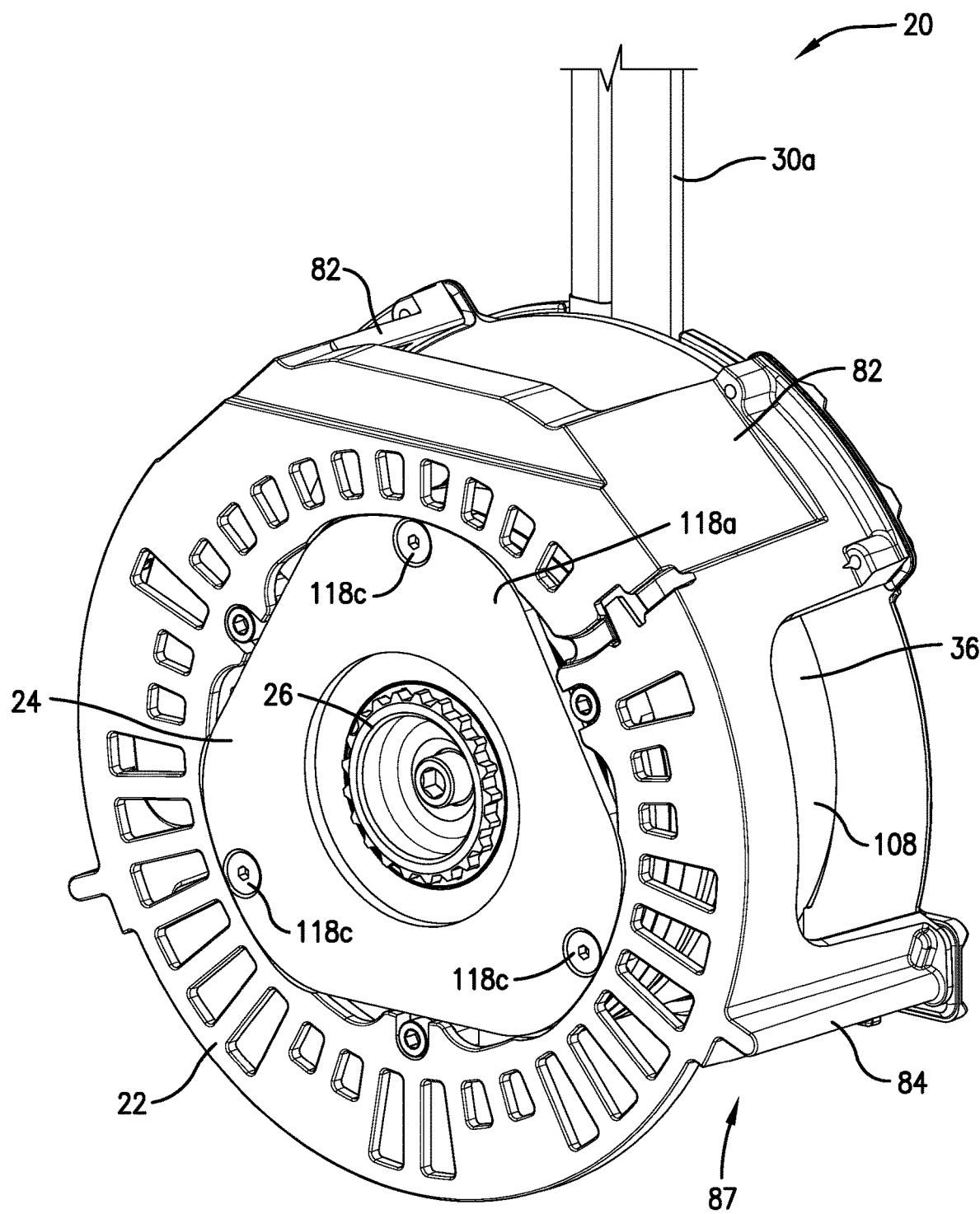
FIG. 1 is a front perspective of a motor assembly constructed in accordance with a preferred embodiment of the present invention, illustrating a motor frame, a brake assembly, and a reel of the motor assembly.
Figure 2:
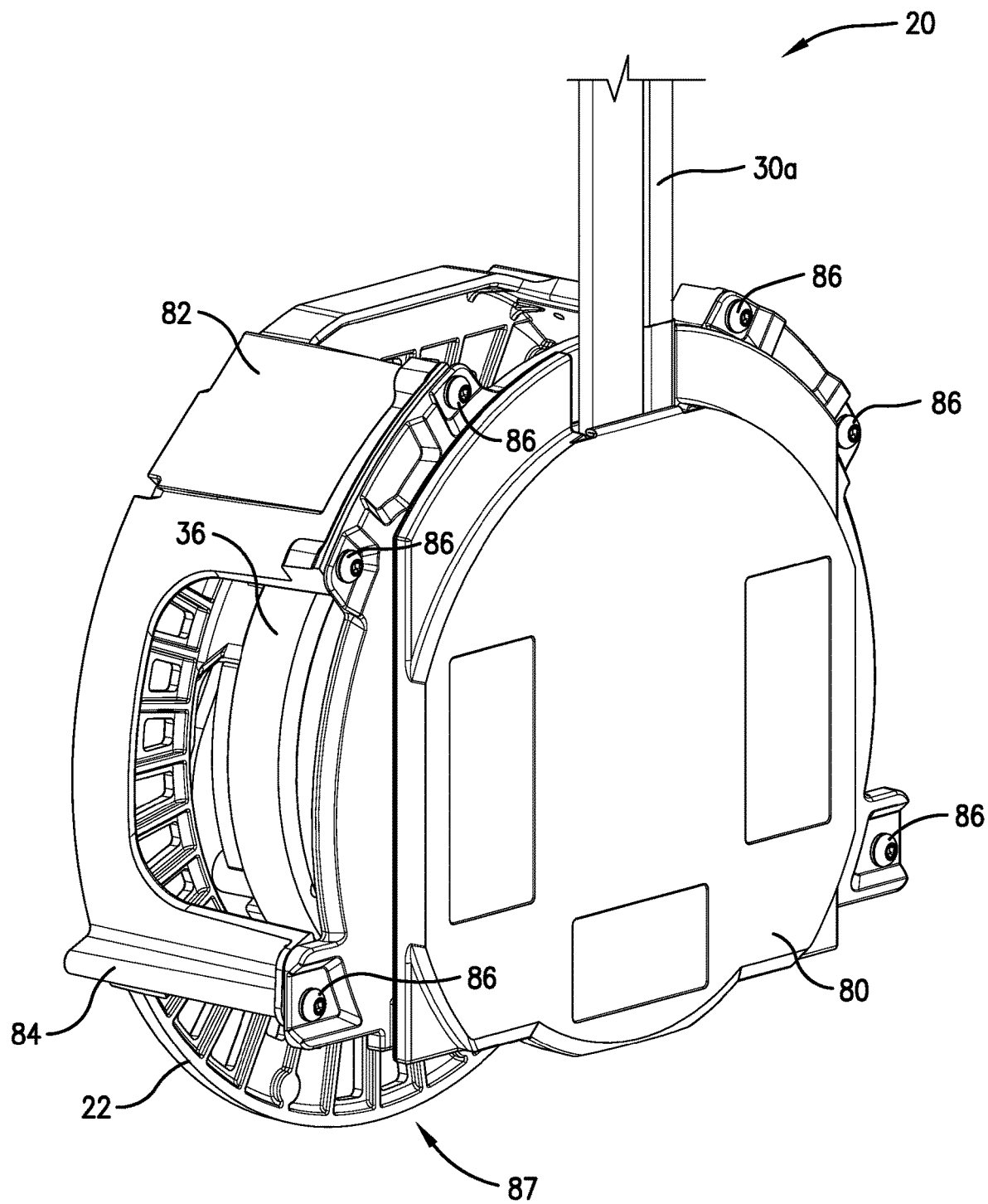
FIG. 2 is a rear perspective of the motor assembly similar to FIG. 1, but taken from the opposite side to depict a motor support and a cover attached relative to an end plate of the motor frame.

The drawing figures do not limit the present invention to the specific embodiments disclosed and described herein.

While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 7:
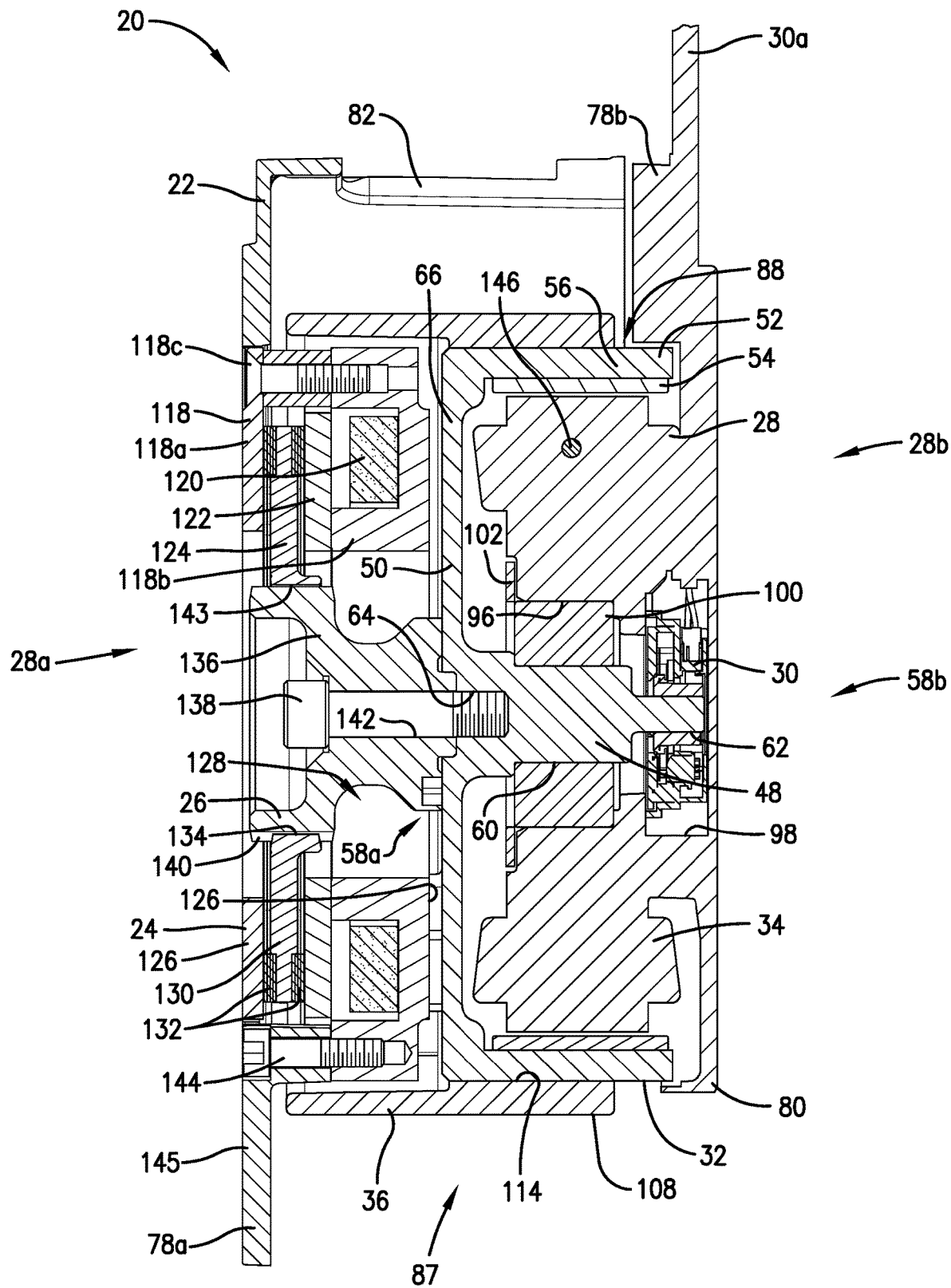
FIG. 7 is a cross section of the motor assembly similar to FIG. 6, but showing the plate shifted out of engagement with the brake disc by an electromagnet so that the brake assembly is disengaged.
Figure 7A:
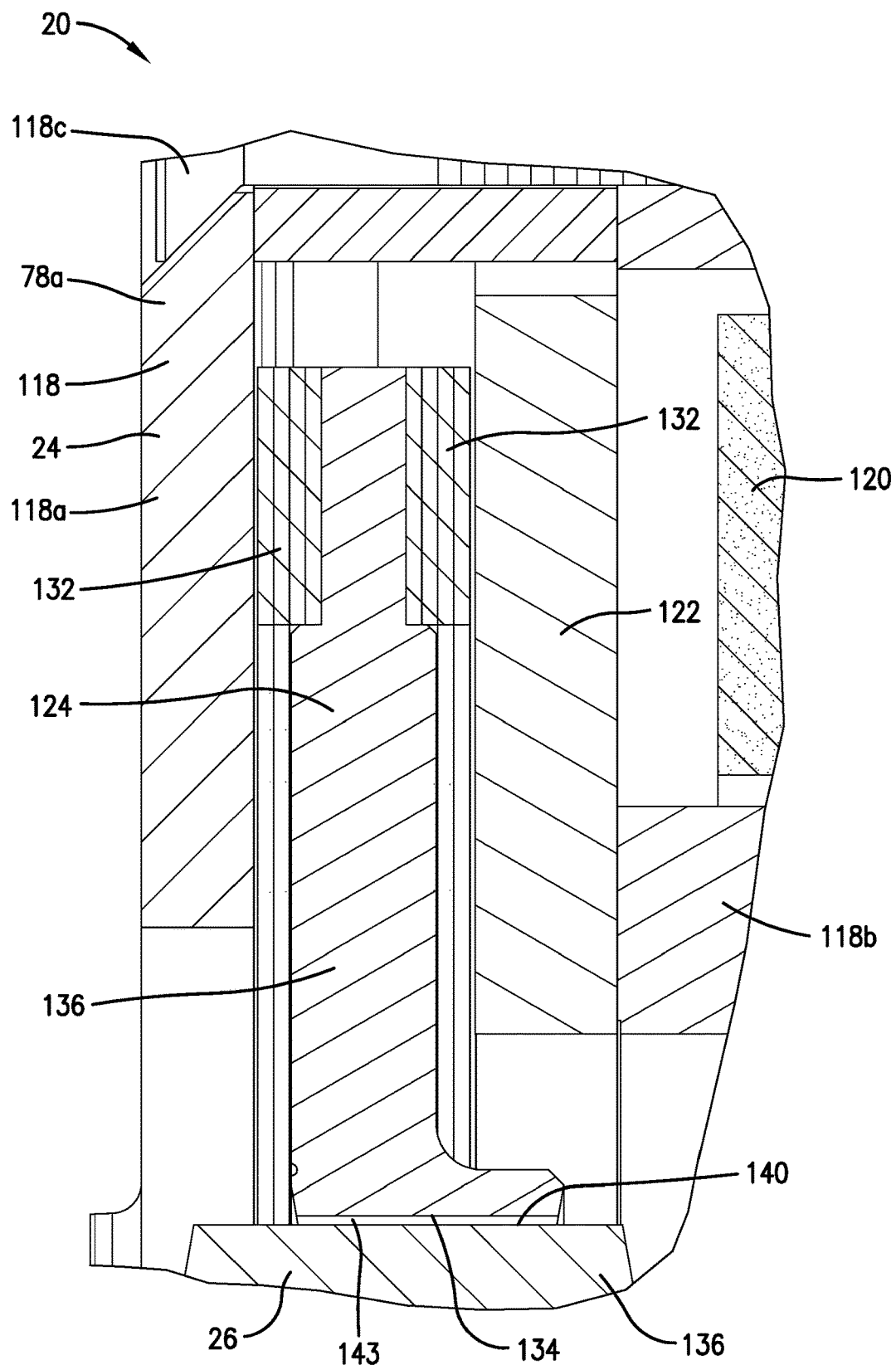
FIG. 7a is an enlarged, fragmentary cross section of the motor assembly shown in FIG. 7, depicting the brake assembly in the disengaged condition.

Turning to FIGS. 1 and 7, an electric motor assembly 20 is constructed in accordance with a preferred embodiment of the present invention. The motor assembly 20 broadly includes, among other things, a motor frame 22, a brake assembly 24, a coupler 26, an outer rotor motor 28, and an encoder 30.

The depicted motor assembly, including the inventive arrangement of the brake assembly and encoder relative to the outer rotor motor, may be incorporated into a variety of applications and may be variously configured for use in such applications. Similarly, it will be appreciated that embodiments of the motor assembly may be configured to supply rotational power to any of various alternative devices, and such alternative devices may include a variety of power transmission elements (for example, shafts, gears, sprockets, chains, belts, pulleys, wheels, etc.).

Figure 6:
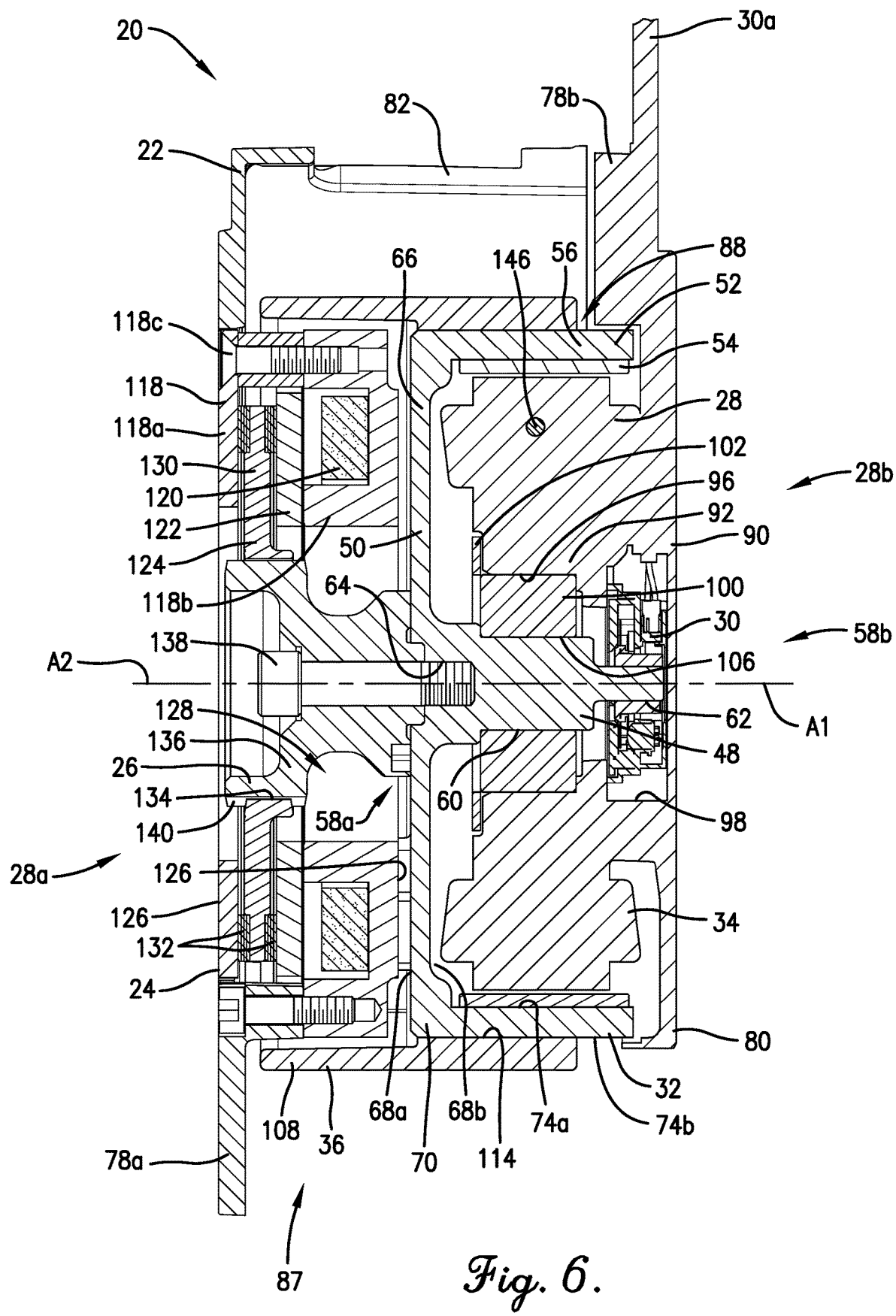
FIG. 6 is a cross section of the motor assembly shown in FIGS. 1-5, depicting a brake disc and a plate of the brake assembly, with the plate shifted into engagement with the brake disc so that the brake assembly is engaged.

The outer rotor motor 28 broadly includes a rotor 32 and a stator 34 (see FIG. 6). The rotor 32 is preferably rotatable relative to the stator 34 about a rotor axis A1 that extends between opposite motor ends 28a,b (see FIG. 6). In a preferred embodiment, the rotor 32 at least substantially circumscribes the stator 34. The motor 28 is supported within the motor frame 22 and is configured to drive a reel 36. As will be described in greater detail, the motor assembly 20 is preferably configured so that a sensor associated with the motor assembly 20 is protected from contamination or interference due to the brake assembly 24.

The stator 34 preferably defines a stator axis A2 (see FIG. 6). Most preferably, the axis A2 is co-axial with the axis A1 of the rotor 32, although offset or skewed axes are permissible according to some aspects of the present invention.

The illustrated rotor 32 preferably includes a rotor core 48 and a plurality of arcuately arranged magnets 54 (see FIG. 6). The depicted rotor core 48 preferably includes a vertical core section 50 and an outer core section 52. The outer core section 52 of the rotor core 48 supports the magnets 54 and circumscribes the stator 34 (see FIG. 7).

The illustrated rotor core 48 presents opposite ends 58a,b, a bearing surface 60 spaced between the ends 58a,b, and an encoder surface 62 associated with the end 58b (see FIG. 7). The rotor core 48 also preferably presents a threaded opening 64 associated with the end 58a.

Figure 5:
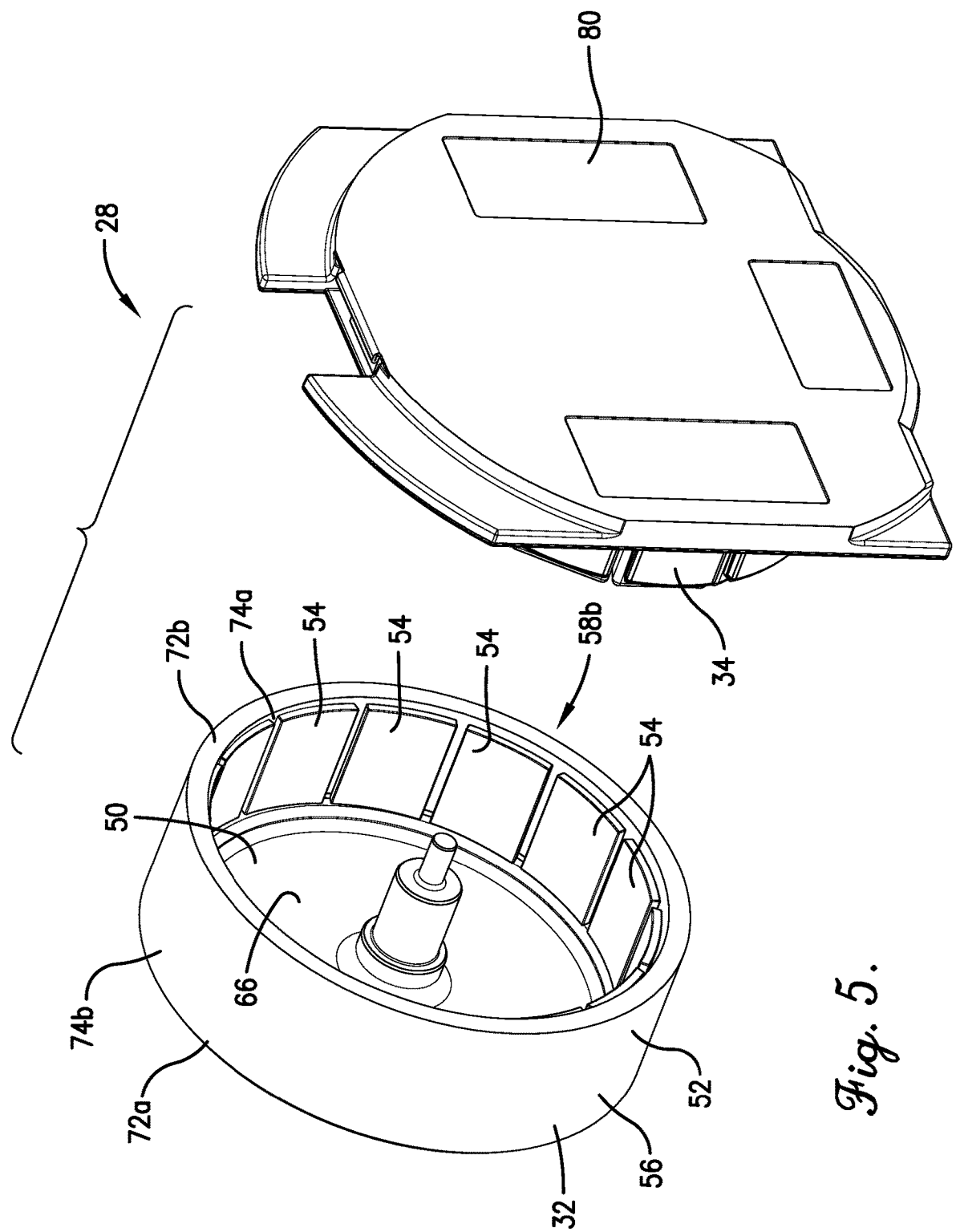
FIG. 5 is an exploded perspective of the motor assembly shown in FIGS. 1-4, but taken from the opposite side of the motor.

The vertical core section 50 preferably forms a solid partition 66 (see FIG. 5). The partition 66 extends radially outwardly to present axially opposite sides 68a,68b (see FIG. 6).

The partition 66 preferably has a continuous and solid construction. However, certain aspects of the present invention contemplate a non-solid partition configuration (for example, a spoked plate).

Preferably, the illustrated vertical core section 50 is located so that the stator 34 is spaced axially from the side 68b of the vertical core section 50. The vertical core section 50 is also preferably positioned between the brake assembly 24 and the stator 34.

It is within the ambit of at least some aspects of the present invention for the vertical core section 50 to be alternatively configured (for example, to facilitate motor reliability and operational life).

The outer core section 52 is configured to support the magnets 54 for rotation with the vertical core section 50. The outer core section 52 has a generally cylindrical tube shape and presents opposite axial end margins 72a,b (see FIG. 5). The outer core section 52 also presents inner and outer surfaces 74a,b that extend between the end margins 72a,b (see FIG. 6).

Turning to FIGS. 1-4, the outer rotor motor 28 is operably supported by the motor frame 22. The depicted frame 22 includes opposite end plates 78a,b and a motor support 80 (see FIG. 2). The frame 22 also includes a pair of braces 82 and a pair of legs 84 located along the periphery of the frame 22. The braces 82 and legs 84 are integrally formed with the end plate 78a and attached to the end plate 78b with fasteners 86.

Figure 3:
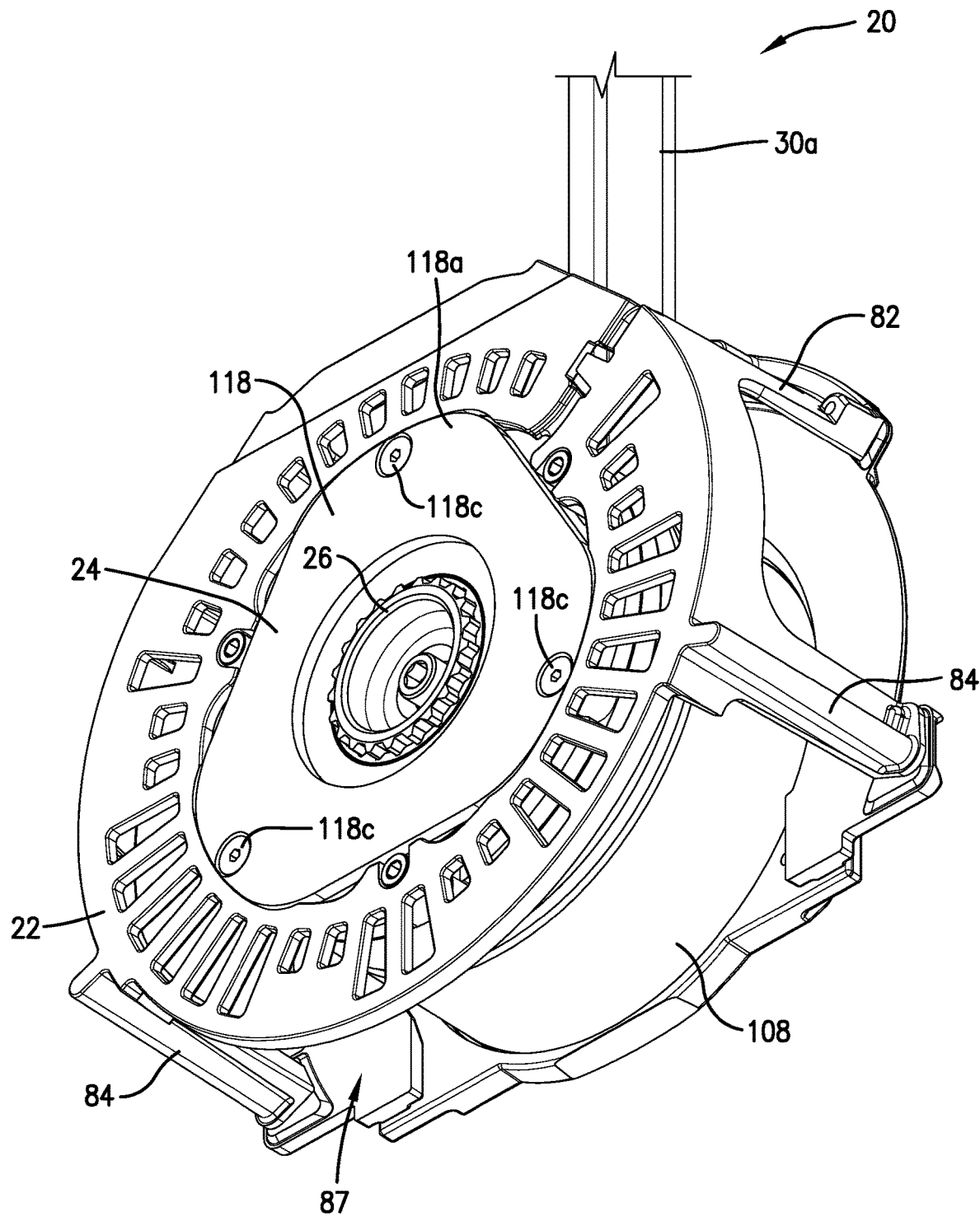
FIG. 3 is a lower front perspective of the motor assembly shown in FIGS. 1-2, showing end plates of the motor frame connected by legs, with an access opening being defined between the legs.

The end plates 78a,b cooperatively define an access opening 87 extending between the legs 84 (see FIG. 3). The access opening 87 preferably provides driving access to the rotor, such that the rotor is operable to be drivingly connected to a variety of power transmission elements (such as, shafts, gears, sprockets, chains, belts, pulleys, wheels, etc.).

The motor support 80 preferably locates the outer rotor motor 28 within a space 88 (see FIGS. 6 and 7) defined between the end plates 78a,b of the motor frame 22. The motor support 80 includes a support plate 90 and a tubular mount 92 projecting from the support plate 90 (see FIG. 6). The motor support 80 also presents an interior socket (not shown) that surrounds the tubular mount 92 and is configured to receive part of the outer rotor motor 28. The motor support 80 further presents a bore 96 (see FIG. 7) extending through the tubular mount 92 and an exterior socket 98 (see FIG. 7) that communicates with the bore 96.

Turning again to FIGS. 6 and 7, the outer rotor motor 28 is configured to be operably mounted to the motor frame 22 by the motor support 80. The stator 34 is removably mounted on the tubular mount 92. However, it will be appreciated that the motor is operable to be alternatively supported and/or positioned relative to the motor frame 22.

The rotor 32 is preferably rotatably supported relative to the tubular mount 92 with a bearing 100, which is secured by a flange 102 (see FIGS. 6 and 7). The bearing 100 presents a bearing opening 106 (see FIG. 6).

The depicted bearing 100 is operably positioned in the tubular mount 92 and engages the bore 96 of the tubular mount 92 (see FIG. 7). The bearing opening 106 receives a part of the rotor core 48 so that an end 58b of the rotor core 48 is located within the exterior socket 98 and the vertical core section 50 is located inwardly (relative to the motor support 80) from the stator 34 (see FIG. 7). Preferably, the rotor 32 is operably supported by the bearing 100 to spin freely relative to the motor support 80.

The reel 36 is operably attached to the rotor 32 and is rotatable therewith. The reel 36 preferably includes a spool 108 (see FIG. 4). The reel 36 also includes an inner attachment structure 114 attached to the rotor 32 (see FIG. 7). As a result, driving rotation of the rotor 32 causes a corresponding rotation of the reel 36.

The depicted reel 36 is preferably positioned to at least partly circumscribe the outer rotor motor 28 and is received in the space 88.

Turning to FIGS. 4 and 6-7a, the brake assembly 24 is operably coupled to the rotor core 48 to selectively reduce the rotational speed of the rotor 32 (for example, to slow the rotational speed or to altogether stop and prevent rotation of the rotor 32), which correspondingly reduces the rotational speed of the reel 36. As will be described further, the brake assembly 24 is preferably positioned relative to other components of the motor assembly 20 so that sensors associated with the motor assembly 20 are protected from contamination or interference from the brake assembly 24. For instance, in the depicted embodiment, the brake assembly 24 is preferably spaced axially outward from the side 68a of the vertical core section 50, while the encoder 30 is spaced axially outward from the opposite side 68b of the vertical core section 50. As will be explained, the vertical core section 50 has a solid configuration that preferably serves as a barrier between the brake assembly 24 and a sensor (such as the encoder 30).

Figure 4:
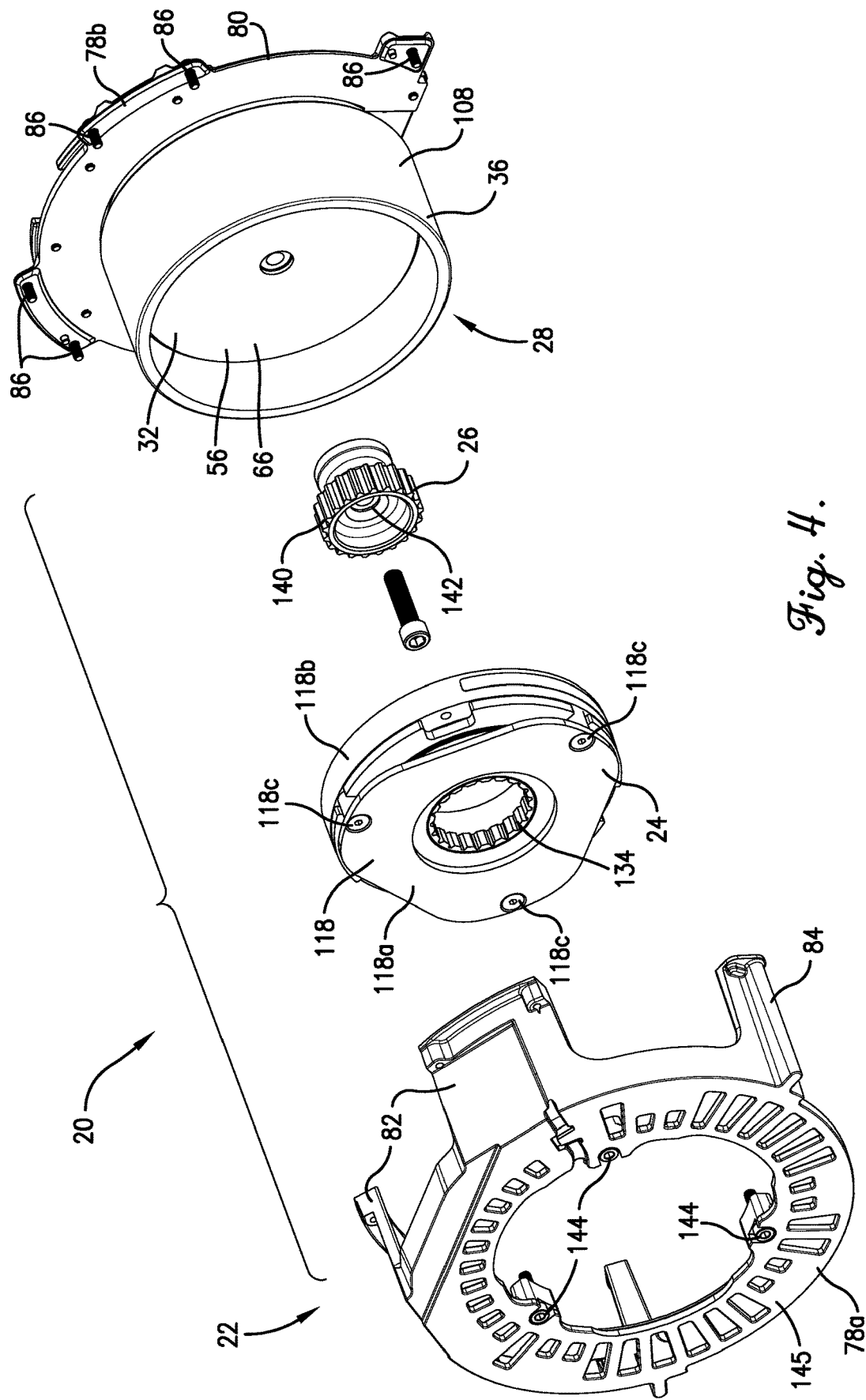
FIG. 4 is a perspective of the motor assembly shown in FIGS. 1-3, showing part of the motor housing, the brake assembly, and a coupler exploded from the rest of the motor assembly.

In the illustrated embodiment, the brake assembly 24 preferably includes a brake housing 118, an electromagnet 120, a shiftable plate 122, and a shiftable brake disc 124 (see FIGS. 4 and 7).

The brake housing 118 includes an outer plate section 118a and an inner section 118b (see FIGS. 4 and 7). The outer section 118a and inner section 118b are removably attached to each other with fasteners 118c. The brake housing 118 presents opposite side faces 126 and an interior space 128 extending between the side faces 126 (see FIG. 7). The brake housing 118 receives the electromagnet 120 within the space 128.

The plate 122 has a circular shape and is located adjacent the electromagnet 120. The plate 122 and the brake disc 124 are operably positioned within the space 128 and shiftable between an engaged condition (see FIGS. 6 and 6a) and a disengaged condition (see FIGS. 7 and 7a).

The brake disc 124 is configured to be frictionally engaged for slowing the outer rotor motor 28. The depicted brake disc 124 includes a body 130 and friction pads 132 on opposite sides of the body 130 (see FIGS. 7 and 7a). The brake disc 124 also presents a splined disc opening 134 to receive the coupler 26 (see FIGS. 4, 7, and 7a). The brake disc 124 is rotatably received by the housing 118 and positioned between the plate 122 and the outer plate section 118a of the brake housing 118.

The illustrated coupler 26 is configured to removably and drivingly connect the brake disc 124 and the rotor 32. The coupler 26 preferably includes a unitary coupler body 136 and a threaded fastener 138 (see FIGS. 4 and 7). The coupler body 136 presents a splined coupler surface 140 and a coupler opening 142 to receive the fastener 138 (see FIGS. 4 and 7). The splined coupler surface 140 is operable to be slidably received by the splined disc opening 134 of the brake disc 124.

Figure 6A:
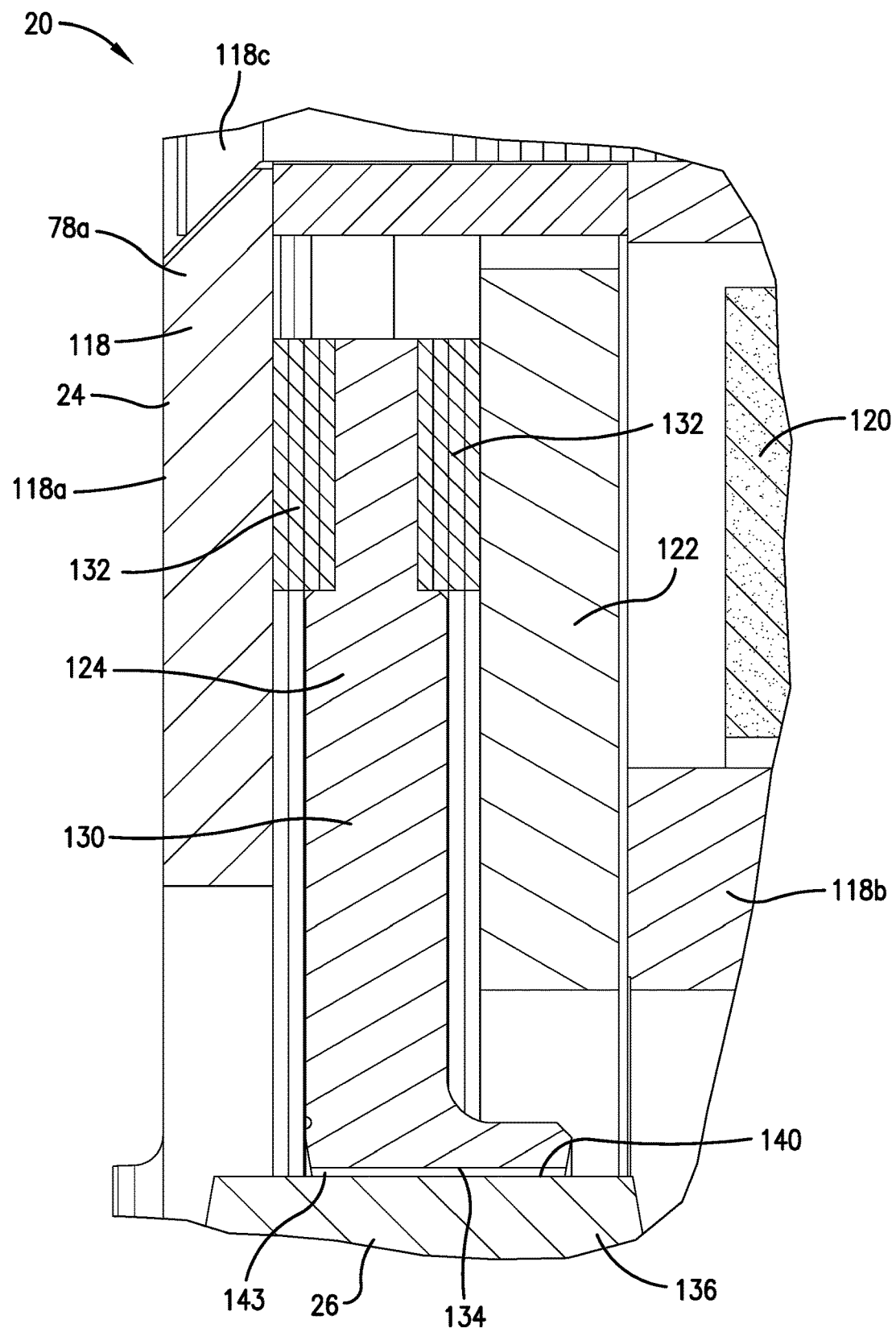
FIG. 6a is an enlarged, fragmentary cross section of the motor assembly shown in FIG. 6, depicting the brake assembly in the engaged condition.

The splined coupler surface 140 and splined disc opening 134 cooperatively provide a sliding joint 143 that permits relative sliding between the brake disc 124 and coupler 26 along the rotor axis A1 (see FIGS. 6 and 6a). At the same time, the splined coupler surface 140 and splined disc opening 134 are drivingly engaged with one another so that the coupler 26 and brake disc 124 are rotatable with one another about the rotor axis A1.

The coupler 26 is preferably configured to provide for quick and convenient driving attachment of the brake assembly 24 to the rotor 32. Preferably, the coupler 26 is attached to the rotor 32 by extending the fastener 138 through the coupler opening 142 and into threaded engagement with the threaded opening 64 of the rotor 32. Consequently, the depicted brake disc 124 is removably and drivingly coupled to the rotor 32 by the coupler 26. It will be appreciated that the coupler 26 provides for modular attachment and detachment of the brake assembly 24 relative to the rest of the motor assembly 20.

Alternative embodiments of the motor assembly may include an alternative coupler arrangement for operably connecting the outer rotor motor to the brake assembly, consistent with the scope of some aspects of the present invention. For instance, the coupler could include an alternative attachment configuration (for example, an alternative threaded fastener) for removable attachment to the rotor.

In alternative embodiments, the coupler may have an alternative driving attachment to the brake disc. For instance, an alternative coupler may have a keyed structure to drivingly engage a slotted opening in the brake disc (so as to permit driving engagement between the coupler and brake disc while allowing relative axial sliding movement).

It will also be appreciated that the male and female connection components of the sliding joint may be switched between the coupler and the brake disc. For instance, an alternative coupler may present a female connection component that drivingly receives a male connection component of the brake disc.

The sliding joint 143 provided by the coupler 26 and brake disc 124 preferably facilitates axial shifting of the plate 122 and brake disc 124 so that the brake assembly 24 can be selectively engaged and disengaged during brake operation. The brake assembly 24 is shiftable into and out of the engaged condition, in which the brake disc 124 is frictionally engaged with the plate 122 and outer section 118a to restrict rotation relative to the brake housing 118 (see FIGS. 6 and 6a). Similarly, the brake assembly 24 is shiftable into and out of a disengaged condition, in which the brake disc 124 is permitted to spin freely relative to the brake housing 118 (see FIGS. 7 and 7a).

In the illustrated embodiment, the brake assembly 24 is removably attached to the motor frame 22 by multiple fasteners 144 (see FIGS. 4 and 7). The depicted brake housing 118 is attached to the motor frame 22 so that the brake assembly 24 is circumscribed by the motor frame 22. In the illustrated embodiment, an outer face 145 presented by the end plate 78a and an outer side face 126 of the brake housing 118 are generally coplanar with one another (see FIG. 7). This combination of the brake housing 118 and the motor frame 22 provides the motor assembly 20 with a relatively compact form factor, particularly in the axial direction. For at least some aspects of the present invention, the brake assembly may be alternatively attached relative to the motor frame.

The motor assembly 20 preferably incorporates sensors that include the encoder 30 and a thermistor 146 (see FIGS. 6 and 7). The encoder 30 and thermistor 146 are configured to sense respective conditions associated with the motor assembly 20. As will be explained below, the encoder 30 and thermistor 146 are preferably positioned relative to the brake assembly 24, and other components of the motor assembly 20, so that these sensors are protected, particularly from contamination or interference produced by the brake assembly 24.

The encoder 30 is configured to sense rotational movement of the rotor 32. The encoder 30 preferably comprises an optical encoder and is connected to an encoder cable 30a. However, it is also consistent with the principles of the present invention for the motor assembly to have an alternative encoder, such as a magnetic encoder. For some aspects of the present invention, alternative embodiments of the motor assembly could be devoid of a encoder.

In the depicted embodiment, the encoder 30 is operably mounted on the encoder surface 62 of the rotor core 48 adjacent the motor end 28a. The encoder 30 is also preferably positioned within the socket 98.

The encoder 30 is preferably positioned so that the stator 34 is located axially between the encoder 30 and the vertical core section 50 (see FIGS. 6 and 7). The depicted encoder 30 is also preferably spaced axially outward from the side 68b of the vertical core section 50 (see FIGS. 6 and 7). However, for some aspects of the present invention, the encoder may be alternatively positioned relative to the rotor. For instance, alternative embodiments of the motor assembly may have the encoder located only partly axially outward from the side 68a of the rotor can base (that is, the side of the vertical core section opposite from the brake assembly). For certain aspects of the present invention, it will be understood that alternative sensor arrangements may be contemplated where an alternative sensor(s) is located on the same side of the brake assembly.

The thermistor 146 is operable to sense a temperature associated with the outer rotor motor. Preferably, the thermistor 146 is located within the stator 34 to sense a temperature of the stator 34. However, in alternative embodiments, the thermistor could be positioned to sense temperature associated with another part of the outer rotor motor.

The thermistor 146 is preferably spaced axially outward from the side 68b of the vertical core section 50 (see FIGS. 6 and 7). However, for some aspects of the present invention, the thermistor may be alternatively positioned relative to the rotor. For instance, alternative embodiments of the motor assembly may have the thermistor located partly axially outward from the side 68a of the rotor can base (that is, the side of the rotor can base opposite from the brake assembly). Again, alternative sensor arrangements, associated with certain aspects of the present invention, may have an alternative sensor(s) located on the same side of the brake assembly. It is also within the scope of the present invention for the motor assembly to include other types of sensors for sensing a condition of the motor assembly.

Again, the motor assembly 20 is preferably configured so that the encoder 30 and thermistor 146 are protected from contamination or interference due to the brake assembly 24. In the illustrated embodiment, the brake assembly 24 is preferably spaced axially outward from the side 68a of the vertical core section 50 (see FIGS. 6 and 7). As discussed above, the encoder 30 and thermistor 146 are preferably spaced axially outward from the side 68b of the vertical core section 50 (see FIGS. 6 and 7).

According to certain aspects of the present invention, the brake assembly may be alternatively positioned relative to the rotor. In alternative embodiments, the brake assembly may be only partly axially outward from the side of the rotor can base. For instance, part of an alternative brake assembly may axially overlap the rotor can base along the rotor axis.

As noted above, according to certain aspects of the present invention, at least one sensor may be alternatively positioned relative to the rotor can base (for example, where the sensor is partly axially outward from the side of the rotor can base).

As described, the brake assembly 24 is preferably positioned so that the vertical core section 50 is located between the brake assembly 24 and the stator 34. The illustrated encoder 30 is also positioned so that the stator 34 is located axially between the encoder 30 and the vertical core section 50. With respect to the thermistor 146, only part of the stator 34 is located axially between the thermistor 146 and the vertical core section 50.

It will also be appreciated that the brake assembly 24 is preferably positioned in a first axial direction at least partly outside the motor end 28a. At the same time, the encoder 30 and thermistor 146 are spaced from the motor end 28a in an opposite second axial direction.

Preferably, the encoder 30 is spaced outwardly from the motor end 28a and is located adjacent the motor end 28b. The illustrated thermistor 146 is located axially between the motor ends 28a,b. Furthermore, it will be appreciated that other sensors may be spaced inwardly and/or outwardly relative to the motor ends.

As described above, the vertical core section 50 preferably has a solid configuration that serves as a barrier between the brake assembly 24 and a sensor (such as the depicted encoder 30 and thermistor 146). More particularly, the positioning and spacing of the vertical core section 50 provides a physical barrier that restricts the migration of any debris (such as brake dust) from the brake assembly 24 to the sensors. The vertical core section 50 also preferably serves as a magnetic barrier to restrict electromagnetic flux or emissions caused by the brake assembly from inadvertently interacting with the sensors. That is, the rotor can base is preferably configured and positioned to reduce or eliminate the risk that the sensors are exposed to electromagnetic interactions caused by the brake assembly. The solid plate of the rotor can base consequently provides both a physical and magnetic barrier so that the sensor environment is generally free of debris and electromagnetic contaminants.

In use, the motor assembly 20 is configured so that the rotor 32 can drivingly spin the reel 36 during operation. The brake assembly 24 is configured to be selectively engaged to reduce the rotational speed of the rotor 32 and the reel 36 (for example, to slow and/or stop rotation).

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. An electric motor assembly comprising:
an outer rotor motor including a stator and a rotor,
said rotor at least partly circumscribing the stator and being rotatable relative to the stator about an axis,
said rotor including a rotor core extending radially outwardly to present axially opposite first and second sides, and a plurality of magnets supported relative to the rotor core;
a sensor operably mounted to the rotor core and operable to sense a condition associated with the electric motor assembly; and a brake assembly operably coupled to the rotor core to selectively reduce the rotational speed of the rotor, said brake assembly being positioned at least partly axially outward from the first side of the rotor core, and the sensor being positioned at least partly axially outward from the second side of the rotor core, said brake assembly being spaced axially outward from the first side of the rotor core, said sensor being spaced axially outward from the second side of the rotor core, said rotor core including a solid partition that presents the sides, said stator being spaced axially from one of the sides of the partition, said partition being located between the brake assembly and the stator.

2. The electric motor assembly as claimed in claim 1, said stator being located axially between the sensor and the partition.

3. The electric motor assembly as claimed in claim 1, said rotor including an outer core section attached relative to the partition, said outer core section supporting the magnets and at least partly circumscribing the stator.

4. The electric motor assembly as claimed in claim 1, said brake assembly including a brake housing and a brake disc rotatably received by the housing, with the brake disc operably coupled to the rotor, said brake assembly having an engaged condition in which the brake disc is frictionally engaged to restrict rotation relative to the brake housing and a disengaged condition in which the brake disc is permitted to rotate relative to the brake housing.

5. The electric motor assembly as claimed in claim 1, said sensor being operably supported by the rotor core and relative to the stator, said sensor including an encoder configured to sense rotor movement.

6. The electric motor assembly as claimed in claim 1, said sensor being operably supported by the rotor core and relative to the stator, said sensor including a thermistor operable to sense a temperature of the outer rotor motor.

7. An electric motor assembly comprising:

an outer rotor motor including a stator and a rotor at least partly circumscribing the stator, said rotor being rotatable relative to the stator about an axis and including a rotor core, said outer rotor motor defining axially opposite motor ends spaced from one another along the axis;

a sensor operably mounted to the rotor core and operable to sense a condition associated with the electric motor assembly; and a brake assembly operably coupled to the rotor core to selectively reduce the rotational speed of the rotor, said brake assembly being positioned in a first axial direction at least partly outside one of the motor ends, and the sensor being spaced from the one motor end in an opposite second axial direction, said rotor including a rotor core with a partition extending radially outwardly to present axially opposite first and second sides, and a plurality of magnets supported relative to the rotor core, said rotor including an outer core section attached relative to the partition, said outer core section supporting the magnets and at least partly circumscribing the stator.

8. The electric motor assembly as claimed in claim 7, said brake assembly being spaced axially outward from the first side of the rotor core, said sensor being spaced axially outward from the second side of the rotor core.

9. The electric motor assembly as claimed in claim 7, said brake assembly being spaced axially outside said one of the motor ends, said sensor being located adjacent the motor end opposite said one of the motor ends.

10. The electric motor assembly as claimed in claim 9, said stator being located axially between the sensor and said one of the motor ends.

11. The electric motor assembly as claimed in claim 7, said rotor core being axially outward from one side of the stator along the axis.

12. The electric motor assembly as claimed in claim 11, said brake assembly being positioned along the axis so that the rotor core is located between the brake assembly and the stator.

13. The electric motor assembly as claimed in claim 7, said brake assembly including a brake housing and a brake disc rotatably received by the housing, with the brake disc operably coupled to the rotor, said brake assembly having an engaged condition in which the brake disc is frictionally engaged to restrict rotation relative to the brake housing and a disengaged condition in which the brake disc is permitted to rotate relative to the brake housing.

14. The electric motor assembly as claimed in claim 7, said sensor being operably supported by the rotor core and relative to the stator, said sensor including an encoder configured to sense rotor movement.

15. The electric motor assembly as claimed in claim 7, said sensor being operably supported by the rotor core and relative to the stator, said sensor including a thermistor operable to sense a temperature of the outer rotor motor.

* * * * *